United States Patent Office 3,541,151
Patented Nov. 17, 1970

3,541,151
PREPARATION OF TERTIARY-BUTYLAMINO-
BENZOPHENONES
Robert V. Coombs, Summit, and Goetz E. Hardtmann,
Florham Park, N.J., assignors to Sandoz-Wander Inc.,
Hanover, N.J.
No Drawing. Filed Dec. 26, 1968, Ser. No. 787,256
Int. Cl. C07d 51/34
U.S. Cl. 260—570                                    4 Claims

ABSTRACT OF THE DISCLOSURE

The invention discloses preparation of 2-tert.-butyl-amino-benzophenones by thermal rearrangement of a corresponding 1-tert.-butyl-4-aryl - 2,1 - benzisoxazoline. The latter compounds are prepared by reduction of a corresponding 1-tert.-butyl-4-aryl - 2,1 - benzisoxazolium salt which may be prepared by reaction of a corresponding 4-aryl-2,1-benzisoxazole with tert.-butanol. The 2-tert.-butylamino-benzophenones are useful as intermediates in preparing pharmaceutically useful 1-substituted-4-aryl-2(1H)-quinazolinones.

---

The invention relates to preparation of 2-tert.-butyl-amino-benzophenones useful as intermediates, and to chemical intermediates useful in the preparation of said 2-tert.-butylamino-benzophenones.

In accordance with the invention it has been found that 2-tert.-butylamino-benzophenones of the Formula I:

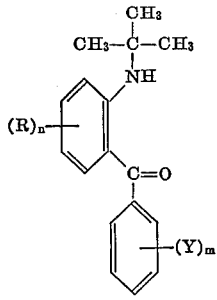

I wherein
R is halo of atomic weight of from 19 to 80; lower alkyl, preferably of 1 to 3 carbon atoms, e.g. methyl; or lower alkoxy, preferably of 1 to 2 carbon atoms;
n is 0 to 2, and when 2 then R is the same or different;
Y is halo of atomic weight of from 19 to 80; lower alkyl, preferably of 1 to 3 carbon atoms; and lower alkoxy, preferably of 1 to 2 carbon atoms; and
m is 0 to 2, and when 2 then Y is the same or different;

are prepared by subjecting to thermal rearrangement a 1-tert.-butylamino-4-aryl-2,1-benzisoxazoline of Formula II:

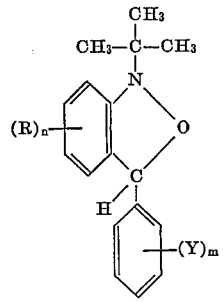

II wherein R, n, Y and m are as above-defined.

The preparation of compounds I by the process of the invention is a thermal rearrangement carried out at elevated temperatures which may be suitably in the range of from 60° C. to 220° C., preferably 100° C. to 180° C. The reaction is conveniently carried out in the absence of a solvent although inert organic solvents of well known conventional types may be employed in practicing the invention. The thermal rearrangement yielding the compounds of Formula I is completed in a relatively short time, typically, between about 30 minutes to 6 hours. The reaction product of Formula I may be recovered in desired form for subsequent use by conventional procedures.

The benzisoxazolines of Formula II are novel compounds which are prepared by a two-step procedure involving in a first Step 1 the reaction of a benzisoxazole of Formula III:

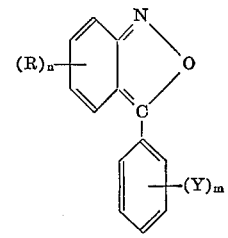

III wherein R, n, Y and m are as defined, with tert.-butanol in the presence of a strong inorganic acid to obtain a 1-tert.-butyl-4-aryl-2,1-benzisoxazolium quaternary salt of Formula IV:

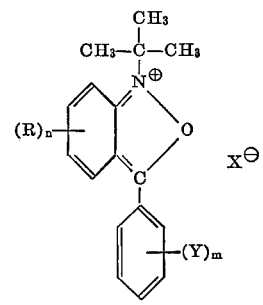

IV wherein R, n, Y and m are as defined, and X⊖ is the anion of the acid forming said quaternary salt, said benzisoxazolium salt of Formula IV then being subjected in Step 2 to reduction in an inert organic solvent to obtain the 1-tert.-butylamino-4-aryl-2,1-benzisoxazoline of Formula II.

The preparation of compounds IV by the reaction of Step 1 may be carried out at temperatures in the range of from 0° C. to 60° C., preferably 10° C. to 35° C., and conveniently at about room temperature. A strong inorganic acid adapted to form a crystalline quaternary salt is required. Acids of this type are known and include by way of illustration perchloric acid and tetrafluoroboric acid. The reaction is carried out in the presence of organic solvent which is inert and adapted to well dissolving the reactants and product compound of Formula IV. Suitable solvents are known and available, and include by way of illustration, the nitrated hydrocarbons such as nitromethane. The resulting reaction product of Formula IV may be isolated from the reaction of Step 1 by working up by conventional procedures.

The preparation of compounds II by Step 2 involving the reduction of a compound IV is desirably effected with a suitable borohydride as reducing agent, desirably an alkali metal borohydride such as sodium borohydride, followed by working up in a manner conventional for borohydride reductions. The reduction may be carried out at temperatures in the range of 0° C. to 80° C., preferably between 15° C. to 30° C. The reaction is carried out in an organic solvent of known type, preferably a lower alkanol such as methanol or ethanol, preferably ethanol.

The reaction products of Formula II may be isolated from the reaction mixture of Step 2 by working up by established procedures.

The benzisoxazoles of Formula III employed as starting material in Step 1 are either known or can be prepared from known materials by established procedures.

The 2-tert. - butylaminobenzophenones of Formula I are useful as intermediates for the preparation of a pharmaceutically active 1-tert.-butyl - 4 - aryl-2(1H)-quinazolinones. For this purpose it is desirable to first convert the 2-tert.-butylaminobenzophenones of Formula I to the corresponding 2-tert.-butylaminobenzophenonimine of Formula IA:

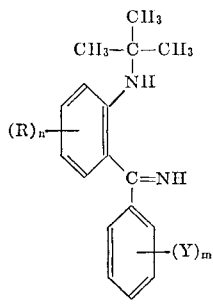

wherein R, $n$, Y and $m$ are as above-defined.

The conversion of a compound I to a compound IA is suitably carried out in a Step 3 by subjecting the compound I to reaction with ammonia in a sealed reactor under anhydrous conditions and at elevated temperatures in the range of 100° C. to 200° C., preferably 110° C. to 150° C. The reaction is preferably carried out in the presence of a catalyst such as a Lewis acid, e.g. zinc chloride. Excess ammonia is conveniently employed as solvent, or a suitable cosolvent may be employed, e.g. dioxane. The reaction product of Formula I may be isolated for use by working up in a conventional manner.

The 2-tert.-butylaminophenonimine of Formula IA are well suited for the preparation of pharmaceutically active 1-tert.-butyl - 4 - aryl-2(1H)-quinazolinones of Formula V:

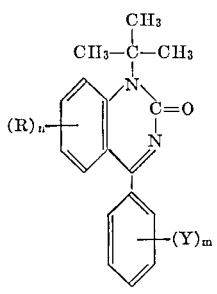

wherein R, $n$, Y and $m$ are as defined, by cyclizing said compound IA in a Step 4 with phosgene in an inert organic solvent.

The production of compound V by Step 4 involving reaction of a compound IA with phosgene may be carried out at temperatures in the range of 0° C. to 50° C., preferably 10° C. to 30° C. The preferred inert organic solvents are aromatic hydrocarbons, e.g., benzene, toluene, xylene and the like, more preferably benzene. The mole ratio of phosgene to compound IA is not particularly critical and a substantial excess of phosgene is employed in the preferred forms of practice to obtain the more efficient reaction rates.

The compounds of structural Formula V are useful because they possess pharmacological activity in animals. In particular, the compounds are useful as anti-inflammatory agents as indicated by the carrageenan-induced edema test on rats (oral administration). For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compounds used and the mode of administration. However, in general, satisfactory results are obtained when administered at a daily dosage of from about .3 milligram to about 100 milligrams per kilogram of body weight, preferably given in divided doses 2 to 4 times a day, or in sustained release form. For most mammals the administration of from about 20 milligrams to about 1000 milligrams of the compound per day provides satisfactory results and dosage froms suitable for internal administration comprise from about 5 milligrams to about 500 milligrams of the compound in admixture with a solid or liquid pharmaceutical carrier or diluent.

The following examples show representative compounds encompassed within the scope of this invention and the manner in which such compounds are prepared. However, it is to be understood that the examples are for purposes of illustartion only and are not intended as in any way limiting the scope of the invention.

EXAMPLE 1

2-tert.-butylamino-5-chloro-4-methyl-benzophenone

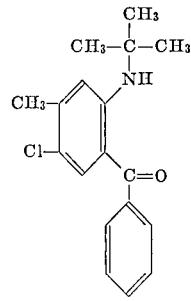

Step A.—Preparation of 1-tert.-butyl-5-chloro-6-methyl-4-phenyl-2,1-benzisoxazolium perchlorate To a solution of 9 g. of 5-chloro-6-methyl-4-phenyl-2,1-benzisoxazole in 500 ml. of nitromethane is added 4 ml. of tert.-butanol and 7.5 ml. of a 60% aqueous solution of perchloric acid. The resulting red/brown solution is allowed to stand at room temperature for 60 hours. It is then diluted with 2 liters of anhydrous diethyl ether. The yellow precipitate obtained is isolated by filtration and redissolved in 100 ml. of acetone. This solution is again diluted with 500 ml. of diethyl ether and the crystalline precipitate formed is isolated by filtration to yield 1-tert.-butyl - 5 - chloro - 6 - mehyl - 4 - phenyl - 2,1 - benzisoxazolium perchlorate, M.P. 183–185°.

Step B.—Preparation of 1-tert.-butyl-5-chloro-6-methyl-4-phenyl-2,1-benzisoxazoline To a suspension of 24 g. of 1-tert.-butyl-5-chloro-6-methyl-4-phenyl-2,1-benzisoxazolium perchlorate in 200 ml. of absolute ethanol is added in portions over 15 minutes 3.5 g. of sodium borohydride. The suspended solid slowly goes into solution and some heat is evolved. The colorless solution is allowed to stand at room temperature for 1 hour during which time a crystalline precipitate is formed. The mixture is then cooled (ice/water) and diluted with an equal volume of water. The solid so produced is isolated by filtration and recrystallized from 50% aqueous ethanol to yield 1 - tert. - butyl - 5 - chloro - 6-methyl-4-phenyl-2,1-benzisoxazoline, M.P. 114–115°.

Step C.—Preparation of 2-tert.-butylamino-5-chloro-4-methyl-benzophenone 11 g. of 1-tert.-butyl-5-chloro-6-methyl-4-phenyl-2,1-benzisoxazoline is heated to a temperature of 160° and maintained thus for 4 hours. The resulting brown oil is cooled and dissolved in 50 ml. of methylene chloride. This solution is filtered through a short column of alumina, more methylene chloride being used to complete the elution. The total eluate is then concentrated under reduced pressure to yield 2-tert.-butylamino-5-chloro-4-methyl-benzophenone as a yellow oil which crystallizes on standing over a period of time, M.P. 76–78°.

EXAMPLE 1A 1-tert.-butyl-6-chloro-7-methyl-4-phenyl-2(1H)-quinazolinone

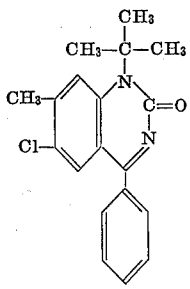

Step A.—Preparation of 2-tert.-butylamino-5-chloro-4-methyl-benzophenonimine

A mixture of 2.6 g. of 2-tert.-butylamino-5-chloro-4-methyl-benzophenone, 15 ml. of anhydrous ammonia and 20 mg. of zinc chloride is heated in a sealed stainless steel cylinder at a temperature of 120° for 2 days. Excess ammonia is then allowed to evaporate and the residue is dissolved in a mixture of 50 ml. of ether and 50 ml. of water. The ether solution is dried over anhydrous sodium sulfate and then evaporated in vacuo to dryness to yield a residue of crude 2-tert.-butylamino-5-chloro-4-methyl-benzophenonimine as a yellow oil.

Step B.—Preparation of 1-tert.-butyl-6-chloro-7-methyl-4-phenyl-2(1H)-quinazolinone To a solution of 2.5 g. of crude 2-tert.butylamino-5-chloro-4-methylbenzophenonimine and 5 ml. of triethylamine in 40 ml. of benzene is added 20 ml. of a 12% solution of phosgene in benzene at a temperature between 5° C. and 20° C. The resulting mixture is allowed to stand at room temperature for 15 minutes and is then evaporated in vacuo to dryness. The residue is dissolved in a mixture of 50 ml. of 0.5 N sodium carbonate and 50 ml. of ether. The ether solution is dried over anhydrous sodium sulfate and then evaporated in vacuo to yield a residue which is crystallized from ethyl acetate. Thus is obtained 1 - tert.butyl - 6 - chloro - 7 - methyl - 4 - phenyl-2(1H)-quinazolinone, M.P. 149–150° C.

It will be evident that various 2-tert.-butylamino-benzophenones of Formula I may be employed to produce other 2-tert.-butylaminobenzophenones by various procedures. For example, the 2-tert.butylamino-5-chloro-4-methyl-benzophenone produced in Example 1, above, may be converted to 2-tert.-butylamino-4-methyl-benzophenone by just subjecting the former to catalytic hydrogenation with hydrogen in the presence of palladium on carbon and a strong base such as an alkali metal hydroxide in a solvent medium at temperature typically between 10° C. to 30° C. to obtain a 2-tert.-butylamino-4-methylbenzhydrol which is then subjected to oxidation in a manner known per se, for example, with an alkalic metal dichromate at temperatures in the range of minus 20° C. to plus 30° C. to obtain the compound 2-tert.-butylamino-4-methyl-benzophenone. The preparation of said 2-tert.-butylamino-4-methyl-benzophenone from 2-tert.-butylamino-5-chloro-4-methylbenzophenone is illustrated below in Example 2.

EXAMPLE 2

2-tert.-butylamino-4-methyl-benzophenone

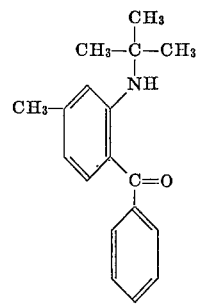

Step A.—Preparation of 2-tert.butylamino-4-methyl-benzhydrol

A mixture of 6 g. of 2-tert.butylamino-5-chloro-4-methylbenzophenone, 2 g. of 5% palladium on carbon and 6 g. of potassium hydroxide in 150 ml. of methanol and 50 ml. of ethyl acetate is shaken at room temperature under an atmosphere of hydrogen at atmospheric pressure. When no further uptake of hydrogen occurs, the mixture is filtered and the filtrate is evaporated in vacuo. The residue is dissolved in a mixture of 250 ml. of ether and 250 ml. of water and the ether solution is dried over anhydrous sodium sulfate. On evaporation of the ether, there is obtained as a yellow oil, 2-tert.butylamino-4-methylbenzhydrol, which on standing slowly solidifies (M.P. 57–63° C.).

Step B.—Preparation of 2-tert.butylamino-4-methyl-benzophenone

A solution of 5 g. of 2-tert.butylamino-4-methylbenzhydrol in 50 ml. of benzene is added dropwise to a solution of 11 g. of sodium dichromate in 10 ml. of acetic acid, 15 ml. of sulfuric acid and 50 ml. of water, cooled in an ice bath. When the addition is complete the stirred reaction mixture is allowed to warm to room temperature during 1 hour. The two phases so obtained are separated and the benzene solution is washed once with 100 ml. of 10% sodium carbonate solution before being dried over anhydrous sodium sulfate. On evaporation of the benzene in vacuo there is obtained 2-tert.butylamino-4-methylbenzophenone as a yellow oil.

EXAMPLE 2A 1-tert.-butyl-7-methyl-4-phenyl-2(1H)quinazolinone

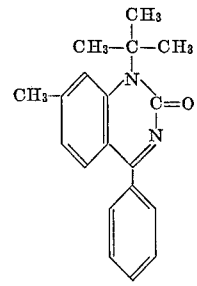

Step A.—Preparation of 2-tert.butylamino-4-methyl-benzophenonimine

A mixture of 1.6 g. of 2-tert.butylamino-4-methylbenzophenone, 10 ml. of anhydrous ammonia and 20 mg. of zinc chloride is heated in a sealed stainless steel cylinder at a temperature of 120° for 3 days. Excess ammonia is then allowed to evaporate and the residue is dissolved in a mixture of 50 ml. of ether and 50 ml. of water. The ether solution is dried over anhydrous sodium sulfate and then evaporated in vacuo to yield a residue of crude 2-tert.butylamino-4-methylbenzophenonimine as a yellow oil.

Step B.—Preparation of 1-tert.-butyl-7-methyl-4-phenyl-2(1H)-quinazolinone

To a solution of 1.5 g. of crude 2-tert.-butylamino-4-methylbenzophenonimine and 5 ml. of triethylamine in 30 ml. of benzene is added 20 ml. of a 12% solution of phosgene in benzene at a temperature between 5° C. and 20° C. The resulting mixture is allowed to stand at room temperature for 15 minutes and is then evaporated in vacuo to dryness. The residue is dissolved in a mixture of 50 ml. of 0.5 N sodium carbonate solution and 50 ml. of ether. The ether solution is dried over anhydrous sodium sulfate and then evaporated in vacuo to yield a residue which is crystallized ethyl acetate. Thus is obtained 1 - tert. - butyl - 7-methyl-4-phenyl-2(1H)-quinazolinone, M.P. 141–143° C.

What is claimed is:

1. The process for preparation of a 2-tert-butylamino-benzophenone of the formula:

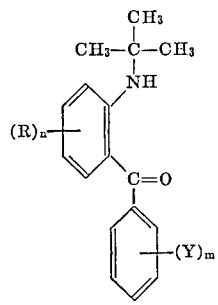

wherein
R is halo of atomic weight of from 19 to 80, lower alkyl, or lower alkoxy;
$n$ is 0 to 2, and when 2 then R is the same or different;
Y is halo of atomic weight of from 19 to 80, lower alkyl, or lower alkoxy; and
$m$ is 0 to 2, and when 2 then Y is the same or different;

said process comprising heating a 1-tert.-butylamino-4-aryl-2,1-benzisoxazoline of the formula:

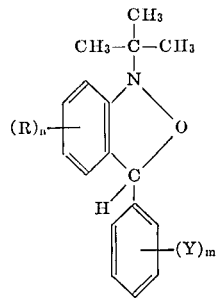

wherein R, $n$, Y and $m$ are as defined, at a temperature in the range of 60° C. to 220° C. to thermally rearrange said 1-tert.-butylamino-4-aryl-2,1-benzisoxazoline and obtain said 2-tert.-butylamino-benzophenone.

2. The process of claim 1 in which the 2,1-benzisoxazoline is heated at a temperature in the range of 100° C. to 180° C.

3. The process of claim 1 in which $m$ is 0.

4. The process of claim 3 in which 1-tert.-butyl-5-chloro-6-methyl-4-phenyl-2,1-benzisoxazoline is subjected to thermal rearrangement.

References Cited

UNITED STATES PATENTS 3,352,877   11/1967   Der Hollander _____ 260—307 X

ROBERT V. HINES, Primary Examiner

U.S. Cl. X.R.

260—251, 307, 566; 424—251